3,663,532
BENZODIAZOCINES
Theodore S. Sulkowski, Narberth, Pa., assignor to American Home Products Corporation, New York, N.Y.
No Drawing. Continuation of application Ser. No. 609,779, Jan. 17, 1967. This application Mar. 4, 1970, Ser. No. 15,313
Int. Cl. C07d 53/00, 99/06
U.S. Cl. 260—239 BD     12 Claims

ABSTRACT OF THE DISCLOSURE

A new class of chemical compounds whose members exert an appetite suppressant and mood-elevating effect in man has been invented. This class is defined as being composed of those compounds having the 1-substituted-2,5-benzodiazocine structure, fully saturated in the non-benzenoid portion, and whose nitrogens are tervalent. Members of this class are prepared by condensing an ortho-benzoylbenzoic acid or ester thereof with an ethylenediamine and reducing with a metallic alkaline hydride the product thus obtained.

---

This application is a continuation of application Ser. No. 609,779, filed Jan. 17, 1967, now abandoned, which is a continuation-in-part of application Ser. No. 554,672, filed June 2, 1966, which is a continuation-in-part of applications Ser. No. 444,050, filed Mar. 30, 1965, and Ser. No. 272,216, filed Apr. 11, 1963, both now abandoned. Application Ser. No. 444,050, filed Mar. 30, 1965, is in turn a continuation-in-part of application Ser. No. 272,-216, filed Apr. 11, 1963.

This application relates to compositions of matter clasified in the art of chemistry as substituted 2,5-benzo-diazocines to intermediates for their preparation and to processes for making them.

The invention sought to be patented in its principal composition aspect is described as residing in the concept of a chemical compound having the 1-substituted-2,5-benzodiazocine structure, fully saturated in the non-benzenoid portion and whose nitrogens are tervalent.

The tangible embodiments of the principal composition aspect of the invention possess the inherent general physical properties of being crystalline solids, are substantially insoluble in water and are soluble in mineral acids, such as hydrochloric acid, in which they form dihydrochlorides. Examination of the compounds produced according to the methods hereinafter described reveals, upon infrared and nuclear magnetic resonance spectrographic analysis, spectral data supporting the molecular structures herein set forth. The aforementioned physical characteristics taken together with the elemental analysis, the nature of the starting materials and the mode of synthesis, confirm the structure of the composition sought to be patented.

The tangible embodiments of the invention possess the inherent applied use characteristics of exerting an appetite suppressant and mood-elevating effect in animals and man, as evidenced by pharmacological and clinical evaluation according to standard test procedures.

As used herein, the term "benzodiazocine" is intended to include only those compounds wherein the heterocyclic ring carbon atoms are attached to exocyclic hydrogen or carbon atoms. It excludes those compounds wherein the carbon atoms may, for example, be doubly bonded to oxygen, the latter being more accurately termed "benzodiazocinones."

As used herein, the term "fully saturated in the non-benzenoid portion" refers to the atoms of the heterocyclic ring excluding the carbon atoms which are shared with the benzenoid portion of the nucleus. The bridging carbons as part of the aromatic ring system participate in the aromatic ring saturation.

As used herein, the term "tervalent" used in describing the nitrogen atoms of the heterocyclic portion of the nucleus means that the nitrogen atoms are not quaternary and do not bear a fourth alkyl group. The use of this term, however, is not intended to exclude the normal acid salts formed by neutralization of the basic amine function with pharmaceutically acceptable acids.

The invention sought to be patented in a second composition aspect is described as residing in the concept of a composition of matter formed by condensing an ortho-benzoylbenzoic acid or an ester thereof, with an ethylenediamine.

The condensation is conducted in a non-reactive solvent or in an excess of one of the reactants, or preferably in pyridine, with heating until elimination of water or alcohol is complete, and separating the product produced therefrom.

The tangible embodiments of the second composition aspect of the invention possess the inherent general physical properties of being crystalline solids, are substantially insoluble in water and are soluble in mineral acids such as hydrochloric acid in which they form a hydrochloride. While the tangible embodiments of the second composition were formerly believed to be 3,4-dihydro-6-phenyl-2,5-benzodiazocin-1(2H)-ones, and were so described in the first two aforesaid prior applications, from the nature of the starting materials, the mode of synthesis, the product obtained on metal hydride reduction, their elemental analysis, and infrared and nuclear magnetic resonance spectrographic analysis, I have now confirmed that the tangible embodiments of the second composition aspect of the invention are in fact 9b-phenyl-1,2,3,9b-tetrahydro-5H-imidazo[2,1-a]isoindol-5-ones.

The tangible embodiment of the second composition aspect of the invention possess the inherent applied use characteristics of being intermediates for the preparation of compositions possessing the inherent applied use characteristic of exerting an appetite suppressant and mood-elevating effect in man, as evidenced by pharmacological and clinical evaluation according to standard test procedures.

The invention sought to be patented in a principal process of making the composition aspect is described as residing in the concept of a sequence of reactions, including:

(a) Condensing an ortho-benzoylbenzoic acid or ester thereof with an ethylenediamine, and, (b) Reducing the product obtained therefrom with a metallic alkaline hydride to obtain a 1-substituted-2,5-benzodiazocine fully saturated in the non-benzenoid portions and whose nitrogens are tervalent.

The manner of making and using the composition aspects of the invention and the process of the invention will now be generally described so as to enable a person skilled in the art of chemistry to make and use the same, as follows:

In describing the invention, reference will be made to the schematic illustration of the reaction sequence for preparing a specific embodiment of the invention below, wherein compounds are assigned Roman numerals sequentially for identification:

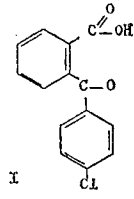

or

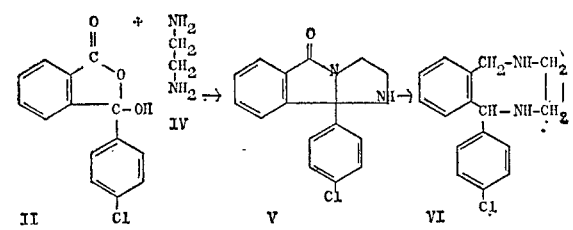

or

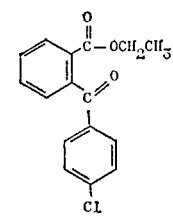

The o-benzoylbenzoic acids [I] either as acids or in their lactol form, i.e., internal ester [II], or their normal esters [III] and the ethylenediamines [IV], which are the starting materials for the preparation of the compounds of the invention or for carrying out the process of the invention, are known in the art or may prepared by methods known to those skilled in the art of chemistry. Condensation of the o-benzoylbenzoic acid, lactol, or ester with the ethylenediamine is carried out by refluxing the reactants for from about 2 to about 16 hours. The condensation is preferably carried out in an inert solvent, such as for example toluene or xylene, or pyridine, but a solvent, while desirable, is not essential if the ethylenediamine is a liquid. The end point of the condensation is reached when no more water distills over, if the o-benzoylbenzoic reactant is in the form of the acid or lactol, and when no more alcohol distills over when the o-benzoylbenzoic reactant is an ester. Preferably, the reaction is performed at a temperature of from about 75-200° C. The product [V] is separated from solvent and unreacted starting materials and recrystallized from a solvent, such as ethanol or ethyl acetate. The recrystallized condensation product is added in small portions to an ether suspension of a metallic alkaline hydride reducing agent, such as for example lithium aluminum hydride, with stirring. Stirring and refluxing are continued for about 15 to 20 hours. Excess hydride reducing agent is decomposed with water. The precipitate is separated, the solution is dried, and the solvent removed under reduced pressure to yield the desired 2,5-benzodiazocine.

It will be apparent to those skilled in the art that both of the aromatic rings of the starting o-benzoylbenzoic acid or ester can be variously substituted with groups that do not interfere with the process of the reaction, such as for example, but not limited thereto, chlorine, alkoxy, hydroxy, nitro, trifluoro, alkyl, amino, and when the o-benzoylbenzoic acid starting material is thus variously substituted, the resulting product will be correspondingly substituted. Therefore, for the process of the invention, these variations on any of the carbons other than the carbons linked to carbonyl are full equivalents of the process as particularly described and claimed.

Similarly, either or both of the carbon atoms of the ethyldiamine starting material can bear alkyl groups, which do not interfere with the course of the reaction, such as methyl, ethyl, propyl, isopropyl, butyl and one, but not both of the amino groups can also bear a similar single alkyl group; one hydrogen atom on one of the nitrogens and two hydrogens on the other nitrogen must be available for the condensation. For the process of the invention, these variations on the starting ethylenediamines are full equivalents of the invention as particularly described and claimed, and the product of the process will be correspondingly substituted.

Furthermore, it will also be apparent to those skilled in the art that the phenyl group of the o-benzoylbenzoic acid or ester starting materal which is part of the "indol" group of the intermediate isoindol-5-one can be fully saturated if in lieu of the o-benzoylbenzoic acid starting material a 2-benzoylcyclohexanecarboxylic acid is employed in the process of the invention.

Moreover, other groups can be employed in lieu of the phenyl group in the "o-benzoyl" portion of the starting o-benzoylbenzoic acid derivative, such as for example but without limitation thereto, benzyl when the starting compound is o-phenacetylbenzoic acid, methyl when the starting compound is o-acetylbenzoic acid, ethyl when the starting compound is o-propionylbenzoic acid, etc.; or it can be a heterocyclic group, such as for example, thienyl, when the starting material is an o-thienylbenzoic acid, furyl, when the starting material is an o-furoylbenzoic acid; the particular o-substituent present in the starting material will constitute the 1-substituent of the benzodiazocine product. In the process of the invention such variations are full equivalents of the process as particularly described.

Where a reactive hydrogen atom is present on a nitrogen of the fully formed benzodiazocine, this position can be acetylated or otherwise acylated with a carboxylic acid anhydride or acid chloride. Reduction with a metal hydride affords a product in which the nitrogen is substituted with an alkyl group. Thus, if a benzodiazocine where both nitrogens contain reactive hydrogen atoms is acylated with two equivalents of a acylating agent, the final reduced product will bear identical alkyl groups on each nitrogen. If only one equivalent of acylating agent is used, then a 5-alkylbenzodiazocine will be the final product. Treatment of this product with a different acylating agent followed by reduction will afford a 2,5-dialkylbenzodiazocine in which the alkyl groups are dissimilar. Compounds bearing an alkyl group only on the 2-nitrogen can be made by acylating a 5-tosyll-2,5-benzodiazocine, reducing the thus formed 2-acyl-5-tosyl-2,5-benzodiazocine with metallic alkaline hydride to form a 2-alkyl-5-tosyl-2,5-benzodiazocine, and removing the tosyl group with mineral acid. If desired, a different alkyl group can be substituted on the 5-nitrogen by acylation and reduction. The preparation of 5-tosyl-2,5-benzodiazocines is described in U.S. patent application Ser. No. 581,750, filed Sept. 26, 1966.

In the applied use characteristic of the principal composition of the invention, all variations on the 2,5-benzodiazocine fully saturated in the non-benzenoid portion and whose nitrogens are tervalent, such as those hereinbefore described while affecting the degree of pharmacological activity, do not affect the kind of activity and therefore with respect to the kind of activity are full equivalents of the compositions as particularly described.

It will be apparent that since the fully formed benzodiazocines bear amino nitrogens that these nitrogens will form amine salts and in the applied use aspect, where the amine salt is formed with a pharmaceutically acceptable acid, these salts are the full equivalents of the free base.

When employed in the applied use characteristic of exerting an appetite suppressant effect, the products of the invention are administered in pharmaceutical forms known to those skilled in the art of pharmacy. Solid form preparations include powders, tablets, dispersable granules, capsules, cachets, and suppositories. A solid carrier can be one or more substances which may also act as diluents, flavoring agents, solubilizers, lubricants, suspending agents, binders, or tablet disintegrating agents; it can also be an encapsulating material. In powders, the carrier is a finely divided solid which is in admixture with the finely divided active compound. In the tablets, the compound is mixed with a carrier having the necessary binding properties in suitable proportions and compacted in the shape and size desired. The powders and tablets preferably contain from 5 or 10 to 99% of the active ingredient. Suitable solid carriers are magnesium carbonate, magnesium stearate, talc, sugar, lactose, pectin, dextrin, starch, gelatin, tracanth, methylcellulose, sodium carboxymethylcellulose, low melting wax, and cocoa butter. Tablets, powders, cachets, and capsules can be used for oral administration and can be incorporated into formulations to obtain delayed or sustained release effects.

Liquid form preparations include solutions, suspensions and emulsions. While the hydrochlorides are soluble, the bases are insoluble in water, but can be dissolved in aqueous organic solvent mixtures that are non-toxic in the amounts used. As an example may be mentioned water propylene glycol solutions for parenteral injection. Liquid preparations can also be formulated in solution, the hydrochlorides usually in water, the bases in aqueous polyethylene glycol. Aqueous suspensions suitable for oral use can be made by dispersing the finely divided bases in water with viscous materials, such as natural or synthetic gums, resins, etc., for example, gum arabic, ion-exchange resins, methylcellulose, sodium carboxymethylcellulose and other well-known suspending agents.

The quantity of compound in a unit dosage form may be adjusted from less than 1 mg. to 1000 mg. (generally within the range of 5 to 250 mg.) and the effective dosage depends upon the stage of the condition being treated, the individual case, and the compound, and will be determined by an attending physician. Generally, a dosage range of from 0.5 to about 150 mg. per kg. of body weight per day constitutes the overall range.

The following examples illustrate the best mode contemplated by the inventor of carrying out the process of the invention and the manner of making and using as intermediates the compositions of the invention.

EXAMPLE 1

Reflux 45 g. of o-benzoylbenzoic acid and 120 ml. of ethylenediamine for 3 hours. Pour the mixture into ice water, allow to stand until the mixture is at room temperature and separate the product by filtration. Recrystallize from ethanol to obtain 9b-phenyl-1,2,3,9b-tetrahydro-5H-imidazo-[2,1-a]isoindol-5-one, M.P. 155–7° C. Elemental analysis confirms the empirical formula $C_{16}H_{14}N_2O$.

Add 40 g. of the condensation product of o-benzoylbenzoic acid and ethylenediamine in small portions to a suspension of 15 g. of lithium aluminum hydride in 1500 ml. of anhydrous ether with stirring. Reflux with stirring for 16 hours. Cool and add water carefully to decompose excess hydride. Separate the ether layer, dry over magnesium sulfate, and remove the solvent under reduced pressure to obtain 1,2,3,4,5,6-hexahydro-1-phenyl-2,5-benzodiazocine, M.P. 125° C. To prepare the dihydrochloride, dissolve the base in anhydrous ether and saturate with dry hydrogen chloride. Separate the precipitated solid, and recrystallize from ethanol to obtain 1,2,3,4,5,6-hexahydro-1-phenyl 2,5-benzodiazocine dihydrochloride, M.P. 297° C. (dec.).

EXAMPLE 2

Condense o-benzoylbenzoic acid (10 g.) and N-ethylethylenediamine (15 ml.) by the procedure of Example 1 to obtain 1 - ethyl - 9b-phenyl-1,2,3,9b-tetrahydro-5H-imidazo[2,1-a]isoindol-5-one, M.P. 122–4° C. (elemental analysis confirms the empirical formula $C_{18}H_{18}N_2O$).

EXAMPLE 3

Condense o-(p-chlorobenzoyl)benzoic acid (10 g.) and ethylenediamine (15 ml.) by the procedure of Example 1 to obtain 9b-(p-chlorophenyl)-1,2,3,9b-tetrahydro - 5H - imidazo[2,1 - a]isoindol - 5 - one, M.P. 164–5° C. (elemental analysis confirms the empirical formula $C_{16}H_{13}ClN_2O$), reduce with lithium aluminum hydride, and treat with hydrogen chloride as described in Example 1 to obtain 1-(p-chlorophenyl)-1,2,3,4,5,6-hexahydro-2,5-benzodiazocine dihydrochloride, M.P. 310° C. (dec.). (elemental analysis confirms the empirical formula $C_{16}H_{17}ClN_2 \cdot 2HCl$).

Resolve 1 - (p-chlorophenyl)-1,2,3,4,5,6-hexahydro-2,5-benzodiazocine by fractional crystallization of the d-10-camphor sulfonic acid salt (the l-salt is more insoluble in ethanol) to obtain the d and l enantiomorphs. Neutralize the camphor sulfonic acid salt with sodium hydroxide and treat with hydrogen chloride to obtain l-1-(p-chlorophenyl) - 1,2,3,4,5,6-hexahydro-2,5-benzodiazocine, dihydrochloride, M.P. 303° C. (dec.), $\alpha_D^{25}$ —118.3° ($H_2O$) and d - 1 - (p-chlorophenyl)-1,2,3,4,5,6-hexahydro-2,5-benzodiazocine, dihydrochloride, M.P. 303° C. (dec.), $\alpha_D^{25}$ +115.9° ($H_2O$).

EXAMPLE 4

Condense o-(p-chlorobenzoyl)benzoic acid (13 g.) and N-ethylethylenediamine (15 ml.) by the procedure of Example 1 to obtain 1-ethyl-9b-(p-chlorophenyl)-1,2,3, 9b-tetrahydro-5H-imidazo[2,1-a]isoindol - 5 - one, M.P. 114° C. elemental analysis confirms the empirical formula $C_{18}H_{17}ClN_2O$).

EXAMPLE 5

Condense methyl-o-(p-methoxybenzoyl)benzoate (7 g.) and ethylenediamine (8 ml.) by procedure of Example 1 to obtain 9b - (p-methoxyphenyl) - 1,2,3,9b-tetrahydro-5H-imidazo[2,1-a]isoindol-5-one, M.P. 159° C. (elemental analysis confirms the empirical formula $C_{17}H_{16}N_2O_2$), reduce with lithium aluminum hydride, and treat with hydrogen chloride as described in Example 1 to obtain 1,2,3,4,5,6 - hexahydro - 1 - (p-methoxyphenyl)-2,5-benzodiazocine dihydrochloride, M.P. 260° C.

EXAMPLE 6

Condense o-benzoylbenzoic acid (22 g.) and 2,3-diaminobutane in toluene (400 ml.) by the procedure of Example 1 to obtain 2,3-dimethyl-9b-phenyl-1,2,3,9b-tetrahydro - 5H - imidazo[2,1-a]isoindol-5-one, M.P. 162–4° C. (elemental analysis confirms the empirical formula $C_{18}H_{18}N_2O$) and reduce with lithium aluminum hydride as described in Example 1 to obtain 3,4-dimethyl-1,2,3,4,5,6-hexahydro-1-phenyl-2,5-benzodiazocine.

EXAMPLE 7

Condense 2 - benzoylcyclohexanecarboxylic acid (15 g.) and ethylenediamine (30 ml.) by the procedure of Example 1 to obtain 9b-phenyl-1,2,3,5a,6,7,8,9,9a,9b-decahydro-5H-imidazo[2,1-a]isoindol-5-one, M.P. 170° C. (elemental analysis confirms the empirical formula $C_{16}H_{20}N_2O$).

EXAMPLE 8

Condense 3-benzyl-3-hydroxyphthalide (15 g.) and ethylenediamine (30 ml.) by the procedure of Example 1 to obtain 9b - benzyl-1,2,3,9b-tetrahydro-5H-imidazo-[2,1-a]isoindol - 5 - one, M.P. 115–7° C. (elemental analysis confirms the empirical formula $C_{17}H_{16}N_2O$), reduce with lithium aluminum hydride and treat with hydrogen chloride as described in Example 1 to obtain 1- benzyl - 1,2,3,4,5,6 - hexahydro-2,5-benzodiazocine dihydrochloride, M.P. 238–40° C.

EXAMPLE 9

Condense 2-benzoyl-4-nitrobenzoic acid with ethylenediamine by the procedure of Example 1 to obtain 8-nitro-9b - phenyl - 1,2,3,9b - tetrahydro-5H-imidazo[2,1-a]-isoindol-5-one, M.P. 203° C.

EXAMPLE 10

Condense o-(p-fluorobenzoyl)benzoic acid with ethylenediamine by the procedure of Example 1 to obtain 9b - (p-fluorophenyl) - 1,2,3,9b - tetrahydro - 5H-imidazo-[2,1-a]isoindol-5-one, reduce with lithium aluminum hydride and treat with hydrogen chloride as described in Example 1 to obtain 1-(p-fluorophenyl)-1,2,3,4,5,6-hexahydro-2,5-benzodiazocine, dihydrochloride, M.P. 303° C. (dec.).

EXAMPLE 11

Condense o-(2-thienoyl)benzoic acid with ethylenediamine by the procedure of Example 1 to obtain 9b-(2-thienyl) - 1,2,3,9b - tetrahydro - 5H - imidazo[2,1-a] isoindol-5-one and reduce with lithium aluminum hydride as described in Example 1 to obtain 1,2,3,4,5,6-hexahydro-1 - (2 - thienyl) - 2,5 - benzodiazocine, M.P. 148° C. The dihydrochloride melts at 241° C.

EXAMPLE 12

In the following table, condense Keto-acid A with Amine B by the procedure of Example 1 to obtain Intermediate C, and reduce Intermediate C as described in Example 1 to obtain Product D:

| Keto-Acid A | Amine B | Intermediate C | Product D |
|---|---|---|---|
| o-(3-thienoyl)benzoic acid | Ethylenediamine | 9b-(3-thienyl)-1,2,3,9b-tetrahydro-5H-imidazo[2,1-a]isoindol-5-one. | 1,2,3,4,5,6-hexahydro-1-(3-thienyl)-2,5-benzodiazocine. |
| O-(3-furoyl)benzoic acid | do | 9b-(3-furyl)-1,2,3,9b-tetrahydro-5H-imidazo[2,1-a]isoindol-5-one. | 1,2,3,4,5,6-hexahydro-1-(3-furyl)-2,5-benzodiazocine. |
| Ethyl o-(m-trifluoromethylbenzoyl)benzoic acid. | do | 9b-(m-trifluoromethylphenyl-1,2,3,9b-tetrahydro-5H-imidazo[2,1-a]isoindol-5-one. | 1,2,3,4,5,6-hexahydro-1-(m-trifluoromethylphenyl)-2,5-benzodiazocine. |
| 2-benzoyl-5-methylbenzoic acid. | do | 7-methyl-9b-phenyl-1,2,3,9b-tetrahydro-5H-imidazo[2,1-a]isoindol-5-one. | 1,2,3,4,5,6-hexahydro-8-methyl-1-phenyl-2,5-benzodiazocine. |
| 2-benzoyl-5-methoxybenzoic acid. | do | 7-methoxy-9b-phenyl-1,2,3,9b-tetrahydro-5H-imidazo[2,1-a]isoindol-5-one. | 1,2,3,4,5,6-hexahydro-8-methoxy-1-phenyl-2,5-benzodiazocine. |
| 2-benzoyl-5-trifluoromethylbenzoic acid. | do | 9b-phenyl-1,2,3,9b-tetrahydro-7-trifluoromethylphenyl-5H-imidazo[2,1-a]isoindol-5-one. | 1,2,3,4,5,6-hexahydro-1-phenyl-8-trifluoromethylphenyl-2,5-benzodiazocine. |
| 4-amino-2-benzoylbenzoic acid. | do | 8-amino-9b-phenyl-1,2,3,9b-tetrahydro-5H-imidazo[2,1-a]isoindol-5-one. | 9-amino-1,2,3,4,5,6-hexahydro-1-phenyl-2,5-benzodiazocine. |
| 2-(p-chlorobenzoyl)-4,5-dimethoxybenzoic acid. | do | 9b-(p-chlorobenzoyl)-7,8-dimethoxy-1,2,3,9b-tetrahydro-5H-imidazo-[2,1-a]isoindol-5-one. | 1-(p-chlorophenyl)-8,9-1,2,3,4,5,6-hexahydro-2,5-benzodiazocine. |
| 2-propionylbenzoic acid | 2,3-diaminobutane | 2,3-dimethyl-9b-ethyl-1,2,3,9b-tetrahydro-5H-imidazo[2,1-a]isoindol-5-one. | 3,4-dimethyl-1-ethyl-1,2,3,4,5,6-hexahydro-2,5-benzodiazocine. |
| 5-amino-2-acetylbenzoic acid. | N-methylethylenediamine. | 7-amino-1,9b-dimethyl-1,2,3,9b-tetrahydro-5H-imidazo[2,1-a]isoindol-5-one. | |
| 2-(p-trifluoromethylbenzoyl)benzoic acid. | N-ethylethylenediamine. | 1-ethyl-9b-(p-trifluoromethylphenyl)-1,2,3,9b-tetrahydro-5H-imidazo[2,1-a]isoindol-5-one. | |
| 4-chloro-2-(p-methoxybenzoyl(benzoic acid. | N-methylethylenediamine. | 8-chloro 9b-(p-methoxyphenyl-1-methyl- 1,2,3,9b-tetrahydro-5H-imidazo[2,1-a]isoindol-5-one. | |
| 2-(p-methylbenzoyl)-5-methylbenzoic acid. | Ethylenediamine | 7-methyl-9b-(p-methylphenyl)-1,2,3,9b-tetrahydro-5H-imidazo[2,1-a]isoindol-5-one. | 8-methyl-1-(p-methylphenyl)-2,5-benzodiazocine. |
| 2-benzoyl-4,5-dichlorobenzoic acid. | do | 7,8-dichloro-9b-phenyl-1,2,3,9b-tetrahydro-5H-imidazo[2,1-a]isoindol-5-one. | 8,9-dichloro-1,2,3,4,5,6-hexahydro-1-phenyl-2,5-benzodiazocine. |
| o-(2-thienoyl)benzoic acid | 2,3-diaminobutane | 2,3-dimethyl-9b-(2-thienyl)-1,2,3,9b-tetrahydro-5H-imidazo[2,1-a]isoindol-5-one. | 3,4-dimethyl-1,2,3,4,5,6-hexahydro-1-(2-thienyl)-2,5-benzodiazocine. |
| o-(p-Hydroxybenzoyl)benzoic acid. | Eethylnediamine | 9b-(p-hydroxyphenyl)-1,2,3,9b-tetrahydro-5H-imidazo[2,1-a]isoindol-5-one, m.p. 266–8° C. | 1-(p-hydroxyphenyl)-1,2,3,4,5,6-hexahydro-2,5-benzodiazocine. |
| o-(3-amino-4-chlorobenzoyl)-benzoic acid. | do | 9b-(3-amino-4-chlorophenyl)-1,2,3,9b-tetrahydro-5H-imidazo[2,1-a]isoindol-5-one, m.p. 172–4° C. | 1-(3-amino-4-chlorophenyl)-1,2,3,4,5,6-hexahydro-2,5-benzodiazocine. |
| o-(3-amino-4-chlorobenzoyl)-benzoic acid. | N-methylethylenediamine. | 9b-(3-amino-4-chlorophenyl)-1-methyl-1,2,3,9b-tetrahydro-5H-imidazo[2,1-a]isoindol-5-one, m.p 176–8° C. | |
| o-(p-Chlorobenzoyl)benzoic acid. | do | 9b-(p-chlorophenyl)-1-methyl-1,2,3,9b-tetrahydro-5H-imidazo[2,1-a]isoindol-5-one, m.p. 134–6° C. | |
| o-(2,4-dimethoxybenzoyl)benzoic acid. | Ethylenediamine | 9b-(2,4-dimethoxyphenyl)-1,2,3,9b-tetrahydro-5H-imidazo[2,1-a]isoindol-5-one, m.p. 173–5° C. | 1-(2,4-dimethoxyphenyl)-1,2,3,4,5,6-hexahydro-2,5-benzodiazocine. |
| o-(3,4-dichlorobenzoyl)benzoic acid. | do | 9b-(3,4-dichlorophenyl)-1,2,3,9b-tetrahydro-5H-imidazo[2,1-a]isoindol-5-one, m.p. 219–221° C. | 1-(3,4-dichlorophenyl)-1,2,3,4,5,6-hexahydro-2,5-benzodiazocine dihydrochloride, m.p. 320° C. |
| o-(2,4-dichlorobenzoyl)benzoic acid. | do | 9b-(2,4-dichlorophenyl)-1,2,3,9b-tetrahyro-5H-imidazo[2,1-a]isoindol-5-one, m.p. 173–5° C. | 1-(2,4-dichlorophenyl)-1,2,3,4,5,6-hexahydro-2,5-benzodiazocine dihydrochloride, m.p. 306° C. |
| o-(m-Chlorobenzoyl) benzoic acid. | do | 9b-(m-chlorophenyl)-1,2,3,9b-tetrahydro-5H-imidazo[2,1-a]isoindol-5-one, m.p. 173–5° C. | 1-(m-chlorpphenyl)-1,2,3,4,5,6-hexahydro-2,5-benzodiazocine dihydrochloride, m.p. 303° C. |
| o-(p-Bromobenzoyl) benzoic acid. | do | 9b-(p-bromophenyl)-1,2,3,9b-tetrahydro-5H-imidazo[2,1-a]isoindol-5-one, m.p. 158–60° C. | 1-(p-bromophenyl-1,2,3,4,5,6-hexahydro-2,5-benzodiazocine dihydrochloride, m.p. 319° C. |
| 0-(5,6,7,8-tetrahydro-2-naphthoyl)benzoic acid. | do | 9b-(5,6,7,8-tetrahydro-2-naphthyl)-1,2,3,9b-tetrahydro-5H-imidazo[2,1-a]isoindol-5-one, m.p. 165–7° C. | 1-(5,6,7,8-tetrahydro-2-naphthyl)-1,2,3,4,5,6-hexahydro-2,5-benzodiazocine, m.p. 109–110.5° C. |
| o-(p-Toluyl)benzoic acid | do | 1,2,3,9b-tetrahydro-9b-(p-tolyl)-5H-imidazo[2,1-a]isoindol-5-one, m.p. 151–3° C. | 1-(p-tolyl)-1,2,3,4,5,6-hexahydro-2,5-benzoidazocine dihydrochloride, m.p. 299–300° C. (dec.). |
| o-(p-Chlorobenzoyl)benzoic acid. | 1,2-diaminopropane. | (1) 9b-(p-chlorophenyl)-3-methyl-1,2,3,9b-tetrahydro-5H-iidazo[2,1-a]isoindol-5-one, m.p. 130° C. (2) 9b-(p-chlorophenyl)-2-methyl-1,2,3,9b-tetrahydro-5H-imidazo[2,1-a]isoindol-5- one,, m.p. 192° C. | (1) 1-(p-chlorophenyl)-1,2,3,4,5,6-hexadro-4-methyl-2,5-benzodiazocine dihydrochloride, m.p. 306–7° C. (dec.). (2) 1-(p-chlorpenyl)-1,2,3,4,5,6,hexadro-3-methyl-2,5-benzodiazocine dihydrochloride. |
| o-Benzoylbenzoic acid | do | 3-methyl-9b-phenyl-1,2,3,9b-tetrahydro-5H-imidazol[2,1-a]isoindol-5-one, m.p. 149–151° C. | 1,2,3,4,5,6-hexahydro-4-methyl-1-phenyl-2,5-benzodiazocine hydrochloride, m.p. 312° C. (dec.). |
| 0-(p-Trifluoromethylbenzoyl)benzoic acid. | Ethylenediamine | 1,2,3,9b-tetrahydro-9b-(p-trifluoromethylphenyl)-5H-imidazo[2,1-a]isoindol-5-one, m.p. 193–4° C. | 1,2,3,4,5,6-hexahydro-1-(p-trifluoromethylphenyl)-2,5-benzodiazocine dihydrochloride, m.p. 322° C. (dec.). |
| o-(3-bromo-4-methylbenzoyl)benzoic acid. | do | 9b-(3-bromo-4-methylphenyl)-1,2,3,9b-tetrahydro-5H-imidazo[2,1-a]isoindol-5-one, m.p. 191–3° C. | 1-(3-bromo-4-methylphenyl)-1,2,3,4,5,6-hexadro-2,5-benzodiazocine dihydrochloride, m.p. 310° C. (dec.). |
| o-(m-Trifluoromethylbenzoyl) benzoic acid. | do | 1,2,3,9b-tetrahydro-9b-(trifluoromethylphenyl)-5H-imidazo[2,1-a]isoindol-5-one, m.p. 140–2° C. | 1,2,3,4,5,6-hexahydro-1-(m-trifluoromethylphenyl)-2,5-benzodiazocine dihydrochloride. |
| o-(p-Chlorobenzoyl)benzoic acid. | 1,2-diamino-2-methylpropane. | 9b(p-chlorophenyl)-3,3-dimethyl-1,2,3,9b-tetrahydro-5H-imidazo[2,1-a]isoindol-5-one, m.p. 132–3° C. | 1-(p-chlorophenyl)-1,2,3,4,5,6-hexahydro-4,4-dimethyl-2,5-benzodiazocine dihydrochloride. |
| o-(p-Chlorobenzoyl) benzoic acid. | 2,3-diphenylethylenediamine. | 9b-(p-chlorophenyl)-2,3-diphenyl-1,2,3,9b-tetrahydro-5H-imidazo[2,1-a]isoindol-5-one, m.p. 227–9° C. | 1-(p-chlorophenyl)-1,2,3,4,5,6-hexahydro-3,4-diphenyl-2,5-benzodiazocine dihydrochloride. |
| o-(p-Ethylbenzoyl)benzoic acid. | Ethylenediamine | 9b-(p-ethylphenyl)-1,2,3,9b-tetrahydro-5H-imidazo[2,1-a]isoindol-5-one, m.p. 128–30° C. | 1-(p-ethylphenyl)-1,2,3,4,5,6-hexahydro-2,5-benzodiazocine dihydrochloride. |

EXAMPLE 13

(a) Fifteen grams of 1-(p-chlorophenyl)-1,2,3,4,5,6-hexahydro-2,5-benzodiazocine is shaken with 25 ml. of acetic anhydride until a clear solution forms. The solution is evaporated to dryness. The residue is dissolved in ethanol and water is added to the point of cloudiness. On standing overnight there is obtained 2,5-bisacetyl-1-(p-chlorophenyl) - 1,2,3,4,5,6 - hexahydro - 2,5 - benzodiazocine, M.P. 137–9° C.

*Analysis.*—Calcd. for $C_{20}H_{21}N_2ClO_2$ (percent): C, 67.31; H, 5.93; N, 7.85; Cl, 9.93. Found (percent): C, 66.96; H, 5.77; N, 7.78; Cl, 9.9.

(b) Six grams of the above benzodiazocine is added to a stirred suspension of 4 g. of lithium aluminum hydride and 200 ml. of anhyd. ether. After refluxing for 17 hours, the mixture is decomposed by careful addition of water. The ether layer is separated, dried over magnesium sulfate and evaporated to dryness. The residue is dissolved in ethanol and saturated with hydrogen chloride. The solid is separate and washed thoroughly with ethanol. On recrystallization from aqueous ethanol there is obtained 1 - (p - chlorophenyl) - 2,5 - diethyl - 1,2,3,4,5,6 - hexahydro - 2,5 - benzodiazocine, dihydrochloride, monohydrate, M.P. 255–7° C. (dec.).

*Analysis.*—Calcd for $C_{20}H_{25}N_2Cl \cdot 2HCl \cdot H_2O$ (percent): C, 57.08; H, 6.96; N, 6.67; Cl, 25.34; $H_2O$, 4.36. Found (percent): C, 56.92; H, 6.89; N, 6.76; Cl, 24.8; $H_2O$, 4.0.

EXAMPLE 14

(a) Five grams of 1,2,3,4,5,6-hexahydro-1-phenyl-2,5-benzodiazocine and 10 ml. of 98% formic acid are refluxed for 16 hours. The mixture is quenched with ice water and the precipitated solid is separated by filtration. After recrystallization from ethanol there is obtained 2,5-diformyl - 1,2,3,4,5,6 - hexahydro - 1 - phenyl - 2,5-benzodiazocine, M.P. 183–5° C.

*Analysis.*—Calcd. for $C_{18}H_{18}N_2O_2$ (percent): C, 73.44; H, 6.16; N, 9.52. Found (percent): C, 73.41; H, 6.22; N, 9.54. (Wy–6965)

(b) In a manner similar to that of Example 13(b), 2,5-diformyl - 1,2,3,4,5,6 - hexahydro - 1 - phenyl - 2,5-benzodiazocine is reduced to 2,5-dimethyl-1,2,3,4,5,6-hexahydro-1-phenyl-2,5-benzodiazocine.

EXAMPLE 15

(a) In a manner similar to that of Example 13(a), 1,2,3,4,5,6 - hexahydro - 1 - (2 - thienyl) - 2,5 - benzodiazocine and propionic anhydride are reacted to obtain 2,5 - dipropionyl - 1,2,3,4,5,6 - hexahydro - 1 - (2 - thienyl)-2,5-benzodiazocine.

(b) In a manner similar to that of Example 13(b), the 2,5-dipropionyl intermediate from above is reduced to 2,5 - dipropyl - 1,2,3,4,5,6 - hexahydro - 1 - (2 - thienyl)-2,5-benzodiazocine.

EXAMPLE 16

(a) Acetyl chloride and 1-(3-bromo-p-tolyl)-1,2,3,4,5,6 - hexahydro - 2,5 - benzodiazocine are reacted in pyridine to obtain 1 - (3 - bromo - p - tolyl) - 2,5 - diacetyl-1,2,3,4,5,6-hexahydro-2,5-benzodiazocine.

(b) In a manner similar to that of Example 13(b), the diacetyl derivative is reduced to 1-(3-bromo-p-tolyl)-2,5-diethyl-1,2,3,4,5,6-hexahydro-2,5-benzodiazocine.

EXAMPLE 17

(a) Benzoyl chloride and 1,2,3,4,5,6 - hexahydro - 1-(α,α,α-trifluoro-p-(tolyl)2,5-benzodiazocine are reacted in pyridine to obtain 2,5-dibenzo-1,2,3,4,5,6-hexahydro-1-(α,α,α-trifluoro-p-tolyl)-2,5-benzodiazocine.

(b) In a manner similar to Example 13(b), the dibenzoyl derivative is reduced to 2,5-dibenzyl-1,2,3,4,5,6-hexahydro - 1 - (α,α,α - trifluoro - p - tolyl) - 2,5 - benzodiazocine.

EXAMPLE 18

(a) Thirteen grams of 1-(p-chlorophenyl)-1,2,3,4,5,6-hexahydro - 5 - (p - tolylsulfonyl) - 2,3 - benzodiazocine and 20 ml. of acetic anhydride are heated in a steam bath until clear solution forms. The solution is evaporated to dryness in vacuo. The residue is dissolved in ethylacetate and extracted with water. After drying over magnesium sulfate the ethylacetate portion is evaporated to dryness. The residue is triturated with ether and the solid separated by filtration. After recrystallization from ethanol there is obtained 2-acetyl-1-(p-chlorophenyl)-1,2,3,4,5,6 - hexahydro - 5 - (p - tolyl - sulfonyl) - 2,5-benzodiazocine, M.P. 160–2° C.

*Analysis.*—Calcd. for $C_{25}H_{25}ClN_2O_3S$ (percent): C, 64.02; H, 5.37; N, 5.97; Cl, 7.56; S, 6.84. Found (percent): C, 63.73; H, 5.37; N, 6.05; Cl, 7.54; S, 7.2.

(b) Ten grams of 2-acetyl-1-(p-chlorophenyl)-1,2,3,4,5,6 - hexahydro - 5 - (p - tolylsulfonyl) - 2,5 - benzodiazocine is added to a suspension of 4 g. of lithium aluminum hydride in 500 ml. of anhydrous ether. After stirring and refluxing for 5 hours, the mixture is hydrolyzed by careful addition of water. The ether portion is separated and evaporated to a solid residue. On recrystallization from ethanol there is obtained 1-(p-chlorophenyl)-2-ethyl-1,2,3,4,5,6 - hexahydro - 5 - (p - tolylsulfonyl) - 2,5-benzodiazocine, M.P. 132–4° C.

*Analysis.*—Calcd. for $C_{25}H_{27}ClN_2O_2S$ (percent): C, 65.97; H, 5.98; N, 6.16; Cl, 7.79; S, 7.05. Found (percent): C, 65.65; H, 6.08; N, 5.91; Cl, 7.4; S, 7.0.

(c) Four grams of 1 - (p - chlorophenyl) - 2 - ethyl-1,2,3,4,5,6 - hexahydro - 5 - (p - tolylsulfonyl) - 2,5-benzodiazocine and 12 ml. of 85% sulfuric acid are warmed in a steam bath for 24 hours, then left at room temperature for an additional 24 hours. The solution is quenched in ice water, then filtered to remove trace impurities. The filtrate is made alkaline with concentrated sodium hydroxide solution and extracted with ethylacetate. The ethylacetate portion is dried over magnesium sulfate, then evaporated to dryness. The residue is dissolved in ether and saturated with hydrogen chloride. The solid is separated and washed with ethanol and acetone. On recrystallization from ethyl there is obtained 1 - (p - chlorophenyl) - 2 - ethyl - 1,2,3,4,5,6 - hexahydro-2,5-benzodiazocine hydrochloride, M.P. 237–9° C.

*Analysis.*—Calcd. for $C_{18}H_{21}ClN_2 \cdot HCl$ (percent): C, 64.10; H, 6.57; N, 8.30; Cl, 21.03. Found (percent): C, 64.04; H, 8.12; Cl, 21.0.

The subject matter which the applicant regards as his invention is particularly pointed out and distinctly claimed as follows:

1. A chemical compound having the structure:

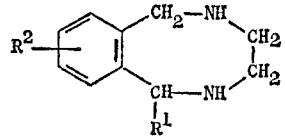

wherein $R^1$ is phenyl, halophenyl. (lower) alkoxyphenyl, halo (lower) alkylphenyl, (lower) alkylphenyl, hydroxyphenyl or thienyl; and $R^2$ is hydrogen, chlorine, (lower) alkyl, (lower) alkoxy or halo (lower) alkyl.

2. The compound of claim 1, 1-(p-bromophenyl)-1,2,3,4,5,6-hexahydro-2,5-benzodiazocine.

3. The compound of claim 1, 1-(m-chyorophenyl-1,2,3,4,5,6-hexahydra-2,5-benzodiazocine.

4. The compound of claim 1, 1-(2-thienyl)-1,2,3,4,5,6-hexahydro-2,5-benzodiazocine.

5. The compound of claim 1, 1-(p-methoxyphenyl)-1,2,3,4,5,6-hexahydro-2,5-benzodiazocine.

6. The compound of claim 1, 1-(p-fluorophenyl)-1,2,3,4,5,6-hexahydro-2,5-benzodiazocine.

7. The compound of claim 1, 1,2,3,4,5,6-hexahydro-4-methyl-1-phenyl-2,5-benzodiazocine.

8. The compound of claim 1, 1-(p-chlorophenyl)1,2,3,4,5,6-hexahydro-2,5-benzodiazocine.

9. The compound of claim 1, 1,2,3,4,5,6-hexahydro-1-phenyl-2,5-benzodiazocine.

10. The compound of claim 1, 1-(p-chlorophenyl)-1,2,3,4,5,6-hexahydro-4-methyl-2,5-benzodiazocine.

11. The process for preparing a chemical compound having the structure:

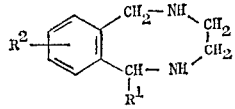

wherein R¹ is phenyl, halophenyl, (lower) alkoxyphenyl, halo (lower) alkylphenyl. (lower) alkylphenyl, hydroxyphenyl or thienyl; and R² is hydrogen, chlorine, (lower) alkyl, (lower) alkoxy or halo (lower) alkyl, comprising:

(a) condensing with ethylenediamine a compound having the structure:

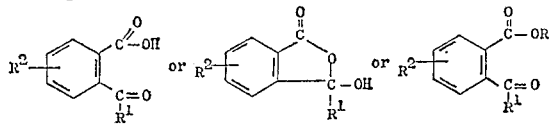

wherein R¹ and R² are as above stated, and R³ is alkyl, and (b) reducing the product obtained therefrom with an alkaline metal hydride.

12. The process comprising reducing with an alkaline metallic hydride a compound having the structure:

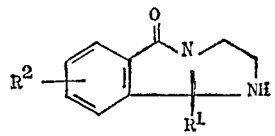

wherein R¹ is phenyl, halophenyl, (lower) alkoxyphenyl, halo (lower) alkylphenyl, (lower) alkylphenyl, hydroxyphenyl or thienyl; and R² is hydrogen, chlorine, (lower) alkyl, (lower) alkoxy or halo (lower) alkyl.

References Cited
FOREIGN PATENTS 646,221   4/1964   Belgium.

ALTON, D. ROLLINS, Primary Examiner

U.S. Cl. X.R.

260—309.7, 329 F, 332.2 A, 332.3 P, 332.5, 343.3, 347.3, 347.4, 469, 473 R, 517; 424—244, 275